United States Patent

Gray et al.

[11] Patent Number: 5,856,791
[45] Date of Patent: Jan. 5, 1999

[54] PORT EXPANDER FOR UTILITY METER READING

[75] Inventors: Bruce E. Gray, Murraysville; Timothy J. Belski, Washington, both of Pa.

[73] Assignee: M&FC Holding Company, Inc., Wilmington, Del.

[21] Appl. No.: 658,238

[22] Filed: Jun. 4, 1996

[51] Int. Cl.⁶ .................................................. H04Q 11/00
[52] U.S. Cl. ........................ 340/870.02; 340/870.03; 340/870.11; 364/483
[58] Field of Search ................ 340/870.02, 310.01, 340/870.03, 870.11, 825.52; 379/106.07, 107.06, 106.11; 364/483

[56] References Cited

U.S. PATENT DOCUMENTS

| | | | |
|---|---|---|---|
| 3,754,250 | 8/1973 | Bruner | 342/44 |
| 4,204,195 | 5/1980 | Schanker | 340/870.03 |
| 4,315,251 | 2/1982 | Robinson | 340/310.06 |
| 4,652,877 | 3/1987 | Gray | 340/870.02 |
| 4,758,836 | 7/1988 | Sciulli | 340/870.31 |
| 4,833,618 | 5/1989 | Verma | 364/483 |
| 5,381,462 | 1/1995 | Larson | 379/106.06 |
| 5,434,911 | 7/1995 | Gray, et al. | 379/106.06 |
| 5,438,329 | 8/1995 | Gastouniotis et al. | 340/870.02 |
| 5,448,230 | 9/1995 | Bogacki | 340/870.03 |
| 5,454,031 | 9/1995 | Gray et al. | 379/106.11 |
| 5,493,287 | 2/1996 | Bane | 340/825.52 |
| 5,602,744 | 2/1997 | Meek | 340/870.02 |

*Primary Examiner*—Brian Zimmerman
*Assistant Examiner*—Albert K. Wong
*Attorney, Agent, or Firm*—Thompson Hine & Flory LLP

[57] ABSTRACT

An electronic expander (12) allows for reading a plurality of utility meters (14) with an interrogation device (30) via a common electronic access point (16) wherein the interrogation device (30) interrogates and receives meter usage data from all of the meters (14) during a single coupling with the common electronic access point (16).

14 Claims, 2 Drawing Sheets

PORT EXPANDER FOR UTILITY METER READING

APPENDIX

Attached hereto as Appendix A is an object code listing of software for use with the microcontroller used in the described embodiment of the present invention. The contents of Appendix A are incorporated herein by reference. Further, Appendix A contains material which is subject to copyright protection. The owner has no objection to facsimile reproduction of the Appendix as it appears in the Patent and Trademark Office patent files or records, but otherwise reserves all rights whatsoever.

BACKGROUND OF THE INVENTION

I. Field of the Invention

The present invention relates to utility meter reading and, more particularly, to electronic automated meter reading ("AMR") systems for reading utility meters.

II. Description of the Prior Art

Various buildings will typically be equipped with utility meters (e.g., gas, water, electric) to monitor the consumption of the particular utility within that building. In order for the utility company to bill for that consumption, the utility meter must be read periodically. Traditionally, utility meters have been read manually by a meter reader physically viewing the dial indicators on the meter face and writing that meter usage data or information on a tracking card or the like. The tracking card would then be turned into the utility which would enter the data into a billing system for subsequent client billing. All of the effort necessary to thus read several meters represents a fairly significant labor cost, creates a risk of error in the meter reading process, and exposes meter readers to risks on the job.

Significant improvements to the process of meter reading have been made, primarily to automate the meter reading and data entry phase. To this end, various systems have been developed in which the meter usage data is read electronically into a recording device which may then be connected to the billing system for automatic downloading and subsequent client billing. By way of example, a utility meter is equipped with an electrically readable register coupled to an electric access point by which to establish electronic communication with a recording device. Such systems are known in the industry as automated meter reading or AMR systems.

One AMR system marketed by Sensus Technologies, Inc., of Uniontown, Pa., is known as the TouchRead system. In that system, the electric register on the meter is coupled via a communication cable (e.g., a pair of wires) to a touch pad located either on an exterior wall of the building or perhaps on a lid cover of an underground pit or vault. The meter reader employs a portable electronic meter interrogating device equipped with a coupler that may be physically mated against the touch pad. When so mated, the interrogating device generates signals via the coupler and touch pad to power and interrogate the register and receive back therefrom meter usage data for that meter. The data is stored in the interrogation device for subsequent use by the utility billing system. The TouchRead system is described in greater detail in U.S. Pat. Nos. 4,758,836 and 4,652,877, the disclosures of both of which are incorporated herein by reference in their entireties.

Other AMR systems are also available, such as the Sensus Technologies' RadioRead and PhonRead systems. In the RadioRead system, the electric access point is a radio transceiver coupled to the register. The interrogating device employs a second radio transceiver adapted to selectively communicate with the meter transceiver to obtain meter usage data therefrom such as described in U.S. Pat. No. 5,438,329, the disclosure of which is also incorporated herein by reference in its entirety. Similarly, the electric access point in the PhonRead system is provided by a meter interface unit ("MIU") at the building which is coupled to the meter register and a telephone line servicing the building. The interrogating device may be a remote computer or data processor which may be contacted via a telephone link to the MIU to obtain the meter usage data. Details of the PhonRead system are provided in U.S. Pat. Nos. 5,434,911 and 5,454,031, the disclosures of both of which in their entireties are incorporated herein by reference.

Notwithstanding significant improvements in cost efficiencies and the like which the AMR systems bring to the field of utility meter reading, they still suffer from the drawback that the interrogation device must establish electronic communication with each meter access point and disconnect therefrom before the interrogation device may communicate with the next meter. Thus, for example, with the TouchRead system, the meter reader must mate the coupler of the interrogation device with the touch pad for a first meter, obtain the meter usage data for that meter, disconnect from the touch pad, re-mate with another touch pad for a second meter, obtain the meter usage data, and disconnect, and so on, one by one until the meter usage data from a selected plurality of meters has been obtained. The same one-by-one sequencing of connect, read, disconnect for each meter is also characteristic of other AMR systems such as the PhonRead and RadioRead systems. Thus, while AMR systems reduce labor costs, errors and exposure risks, further reduction is desired.

SUMMARY OF THE INVENTION

The present invention provides a mechanism to facilitate electronic meter reading of a plurality of utility meters without requiring repetitive connection to and disconnection from a plurality of meter access points in order to read the plurality of meters. To this end, and in accordance with the principles of the present invention, an electronic expander is provided which has a plurality of meter ports communicating with the respective registers of the plurality of meters to be read and a single or common interrogation port which communicates with the electric access point. More specifically, the electronic expander selectively communicates with each meter, such as on a sequential basis, while also communicating with the interrogation device. Consequently, meter usage data is provided to the interrogating device from multiple meters based upon one connection to a single access point.

As will be appreciated, it is desirable that the meter register not require an internal power supply such as a battery or the like. AMR systems, such as those described above, provide power to the meter register from the access point in response to the interrogating device, either by deriving power directly from the signals transmitted into the electric access point by the interrogating device or phone lines in the case of the TouchRead and some PhonRead systems, or from the a power supply contained in the meter radio transceiver in the case of the RadioRead system. In accordance with a further feature of the present invention, the electronic expander is similarly powered from the access point and thus need not contain an internal power supply which could require servicing and/or replacement. Further, the expander simulates the interrogating device to the meter register by providing power from the access point on through to the meter register so as to permit usage of conventional electric-register-equipped meters without alteration or modification, and without the need to provide an auxiliary or internal source of power to interface and operate with the expander.

In accordance with the principles of the present invention, a meter reader need merely establish electronic communication between the interrogating device and but one access point in order to communicate with and read meter usage data from a plurality of meters. Meter reading thus becomes more efficient and reliable, while reducing labor costs and risks of error and exposure.

By virtue of the foregoing, there is thus provided a mechanism which facilitates electronic meter reading of a plurality of utility meters without requiring repetitive connection to and disconnection from a plurality of meter access points in order to read the plurality of meters. These and other objects and advantages of the present invention shall become more apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the principles of the invention.

DETAILED DESCRIPTION OF THE DRAWINGS

Figure 1:
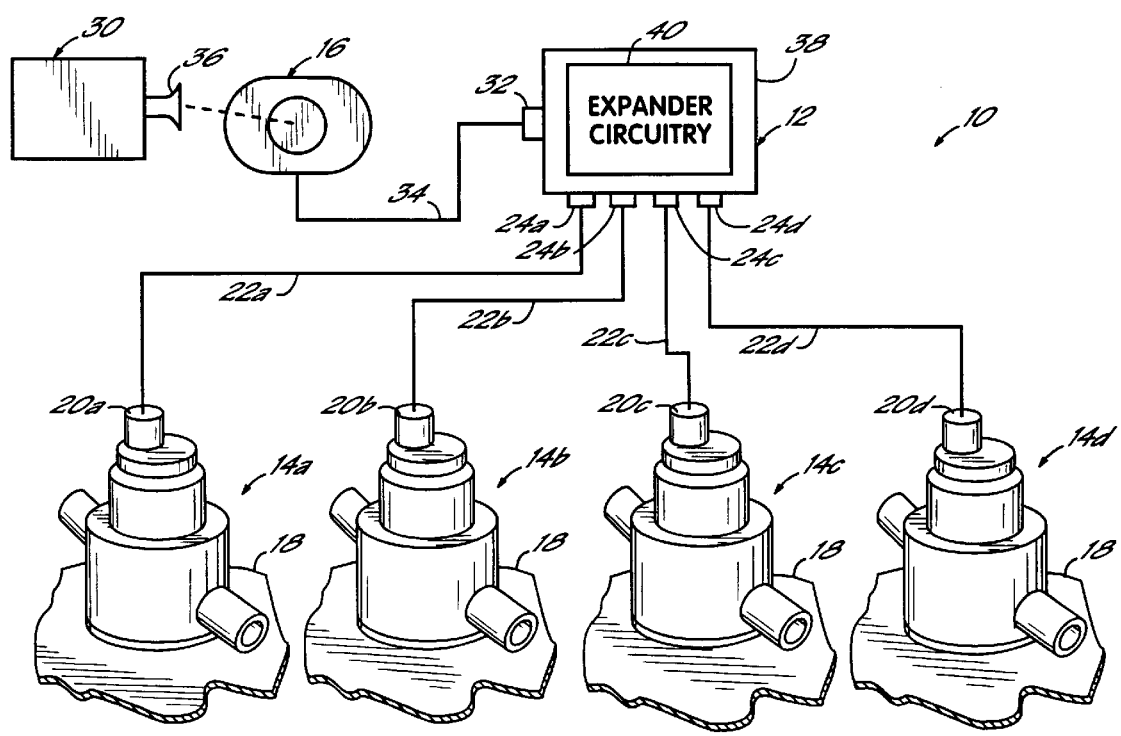
FIG. 1 is a schematic of an electronic automatic meter reading system incorporating an electronic expander of the present invention for reading a plurality of utility meters via a single access point.

With reference to FIG. 1 there is shown a schematic of an electronic automatic meter reading ("AMR") system 10 including an electronic expander 12 according to the principles of the present invention by which to facilitate electronic meter reading of a plurality of utility meters 14 (such as four water meters 14a, 14b, 14c, and 14d) via a common electric access point 16. To this end, each utility meter 14 is associated with a building or portion of a building 18 and includes an electric register 20 such as utilized by the TouchRead, PhonRead, and RadioRead systems above-described. Each respective register 20 is coupled via a communication cable 22 to a respective meter port 24 of electronic expander 12 by which to facilitate electronic communication between expander 12 and the registers 20 of meters 14.

To facilitate communication with an interrogating device 30, electronic expander 12 further includes an interrogation port 32 coupled via communication cable 34 to the access point 16, such as a touch pad of the TouchRead system adapted to mate with coupler 36 of interrogating device 30. Although described in connection with a touch pad, system 10 could, alternatively, employ an MIU or radio transceiver at electric access point 16 for cooperation with the Phon-Read or RadioRead systems, by way of example. Expander 12 includes within its housing 38 electronic expander circuitry 40 (see FIG. 2) by which to facilitate interactive communication between interrogating device 30 and the plurality of meters 14 via a single access point 16 as will now be described.

Figure 2:
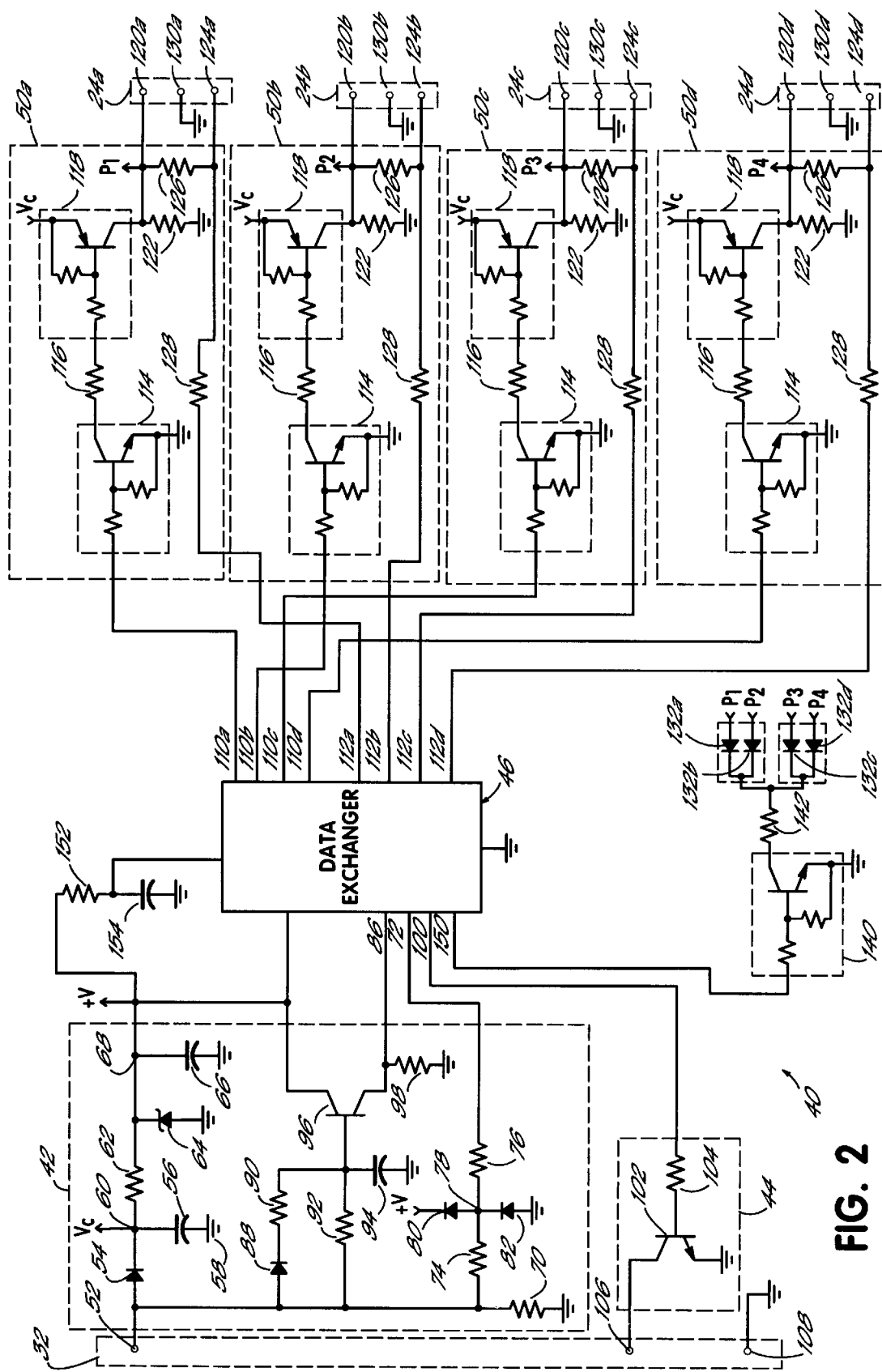
FIG. 2 is a circuit schematic of the electronic expander of FIG. 1.

With reference to FIG. 2, expander circuitry 40 of expander 12 includes interrogation port circuit 42 which receives clock pulses from access point 16 and outputs data in Amplitude Shift Keyed (ASK) format to access point 16. Expander circuitry 40 may further include optional interrogation port output circuit 44 for outputting data in Non Return to Zero (NRZ) format to access point 16. Circuit 42 and output circuit 44 thus establish communication between access point 16 and bidirectional data exchanger 46. Similarly, expander circuitry 40 includes a meter port circuit 50 associated with each meter port 24 for communication between each respective meter 14 and data exchanger 46.

Interrogation port circuit 42 is adapted to receive interrogation signals such as clock pulses from an interrogating device 30 coupled to access point 16 into data exchanger 46 to prompt interrogation of the meters 14 via associated meter port circuits 50 as will be described below. Similarly, meter port circuit 50 is adapted to communicate interrogation clock pulse signals to the associated meter register 20 and to receive therefrom meter usage data which is coupled back to data exchanger 46 for communication to the access point 16 in ASK format via circuit 42 and, optionally, in NRZ format via output circuit 44. Circuit 42 is further adapted to derive power, VC and +V, from the interrogation signals by which to power output circuit 50 and data exchanger 46, respectively.

Interrogation port circuit 42 couples interrogating signals at contact 52 of port 32 to a halfwave rectifier power supply comprised of diode 54 and 15 microfarad ($\mu$F) capacitor 56, the latter of which is coupled to system ground as at 58. The junction 60 of diode 54 and capacitor 56 is coupled through a 1 kilohm (k$\Omega$) resistor 62 to ground via the parallel combination of 5.6 volt zener diode 64 and 0.1 $\mu$F capacitor 66. Junction 60 defines power supply rail VC for powering output circuitry 50. The junction 68 of resistor 62, diode 64 and capacitor 66 defines power supply rail +V for powering data exchanger 46 and other similar purposes as will hereinafter be described. Contact 52 is also coupled to ground through 10 k$\Omega$ resistor 70 and to first bi-directional data port 72 of data exchanger 46 via the series combination of 10 k$\Omega$ resistor 74 and one k$\Omega$ resistor 76. The junction 78 of resistors 74 and 76 is tied between +V and ground via diodes 80 and 82. ASK data is output from port 72 to contact 52 during the low period of incoming interrogation clock pulses received at contact 52 from access point 16. Interrogation signals at contact 52 are coupled to a second bi-directional data port 86 of data exchanger 46 via the parallel combination of series diode 88 and 4.7 k$\Omega$ resistor 90, and 51 k$\Omega$ resistor 92, which in turn are coupled to ground via 2,200 pF capacitor 94 and to the base of the PNP transistor 96, the emitter of which is tied to +V and the collector of which is coupled to bi-directional data port 86 and to ground via 80 k$\Omega$ resistor 98. Typically, the interrogation signals are digital pulses having a low state period of between 250 to 500 $\mu$S and a high state period of between 1.5 to 2.0 milliseconds for an 80% to 90% data cycle. The logical low state may be at ground with the logical high state being normally about +6 volts although the high state could be between 4.5 and 15 volts. The duration of the low period may be altered for communication purposes such as a skip function as will be described below.

Interrogation port output circuit 44 is coupled to third bidirectional data port 100 via the series combination of NPN transistor 102 and 33 k$\Omega$ resistor 104. To this end, the emitter of transistor 102 is coupled to ground and the collector is coupled to contact 106 of interrogation port 32. The base of transistor 102 is coupled to port 100 via resistor 104. Interrogation port 32 further includes a third contact 108 for coupling the access point 16 to system ground of expander circuitry 40. When expander 12 is used with the TouchRead system, for example, contact 106 is ignored and only contacts 52 and 108 are wired via two-wire cable 34 to touch pad 16. However, where an MIU or radio transceiver is to be used, contact 106 is additionally employed with a three wire-cable 34 to also transmit the NRZ data to the MIU or transceiver at access point 16.

Turning to port circuits 50, each port 24 is coupled to an identical port circuit 50 which in turn is coupled to a pair of bi-directional data ports 110 and 112 of data exchanger 46. Port circuit 50a associated with port 24a will be described in detail, it being understood that port circuits 50b, c and d connected to each of ports 24b, c and d, respectively, are identical in construction. Port circuit 50a includes NPN transistor switch 114 (such as part no. DTC124XK available from Rohm Corporation), the input or base of which is coupled to bi-directional port 110a, the emitter of which is coupled to ground, and the collector of which is coupled by 10 kΩ resistor 116 to the base or input of PNP transistor switch 118 (such as part no. DTB113ZK available from Rohm Corporation). The emitter of switch 118 is coupled to VC and the collector thereof is coupled to the clock contact 120 of port 24a for communication with meter 14a via cable 22a. The collector of switch 118 is also coupled to ground via 20 kΩ resistor 122 and to data contact 124 of port 24a via 51 kΩ resistor 126. Contact 124 is coupled to bi-directional data port 112a of data exchanger 46 via 80 kΩ resistor 128. Meter port 24a further includes ground contact 130 for electrically coupling the system ground of expander 12 to the ground of the meter 14.

Each clock contact 120 of each meter port 24 is coupled to the cathode of a respective diode 132, the four anodes of which are coupled in common to the collector of NPN transistor switch 140 (such as part number DTC124XK mentioned above) via 100Ω resistor 142. The emitter of switch 140 is coupled to ground with the base input of switch 140 coupled to fourth bi-directional data port 150. Resistors 98, 104, 116, 126 and 128 may advantageously be made from polymer thick film material having a resistivity of 10Ω/□ and cured to ±20% for resistors 116 and ±40% for the other resistors.

As will be appreciated, data exchanger 46 advantageously includes a program memory ROM section (not shown) by which to provide the functionality of circuitry 40. To this end, data exchanger 46 may be a PIC16C54 microcontroller available from MicroChip Technology Incorporated in Chandler, Ariz. When such a chip is used between meters 14 and access point 16, the VDD, $\overline{MCLR}$ and RTCC lines are coupled to +V, the CLKIN/OSC 1 pin is coupled to +V via 10 kΩ resistor 152 and to ground via 22 pF capacitor 154. The VSS pins are coupled to system ground 58. I/O Port A of the PIC16C54 chip is comprised of bi-directional data pins RA0 and RA1, RA2 and RA3 corresponding to bi-directional data ports 72, 100, 86, and 150, respectively. Similarly, I/O Port B is comprised of bi-directional data pins RB0, RB1, RB2, RB3, RB4, RB5, RB6, and RB7 corresponding to bi-directional data ports 110a–d and 112a–d, respectively. The data exchanger 46 when provided by the above-mentioned microcontroller chip may be programmed as set forth in Appendix A (hex code) to provide the desired functional interactive communication between meters 14 and access point 16 as will now be described.

Data exchanger 46 is programmed such that upon being powered-up (by extracting power for the +V power rail from the incoming interrogating signals at contact 52), it will receive the incoming interrogation clock pulses or signals at bi-directional data port 86. Data exchanger 46 will then sequentially output similar interrogation clock pulse signals at bi-directional port 110a to cause port circuit 50a to couple power and interrogating signals to meter port 24a (and, hence, to meter register 20a of meter 14a) via contact 120a. The low period of these clock pulses is about 250 μS and the high period is present until receipt of the next low clock period at contact 52. Also, while output 110a is low, fourth bi-directional port 150 outputs a signal to close switch 140 to thereby pull contact 120 low. Switch 140 thus acts as an active circuit to improve the response time of meter 14a and its register 20a.

After about 35 to 40 milliseconds of clock pulses to allow register 20a to power-up, meter usage data for meter 14a is received back on contact 124a of port 24a (usually during the high period of the clock signal at contact 120a) and coupled to bi-directional data port 112a of data exchanger 46. Data exchanger 46 will receive a string of signals representing a single character, such as a start bit, several bits of data, and a stop bit. To this end, upon being powered-up, register 20a should output a high signal. The start bit is indicated by a transition to a low state with the subsequent bits then being received in asychronous fashion followed by the stop bit represented by a return to the high state.

Data exchanger 46 is advantageously programmed to output a START signal or character at port 100 while receiving the first string of bits. the START character is coupled to access point 16 (for communication into device 30) in ASK format back out of contact 52 from port 72 and in NRZ format from port 100 via contact 106 and output circuit 102. Following the START signal, as the second string of bits is being received from the meter 14, the first character of meter usage data at port 112a is retransmitted from ports 72 and 100 to be recorded by device 30. Upon completion of receiving all of the characters representing the meter usage data from meter 14a, data exchanger 46 now initiates communication with meter 14b via port circuit 50b and meter port 24b. While obtaining the first string of bits from meter 14b, data exchanger 46 outputs a NEXT signal or character at ports 72 and 100 followed thereafter by the meter usage data from meter 14b. The above sequence of a NEXT signal or character and meter usage data is repeated for each of the remaining meters (e.g., 14c and 14d in the embodiment described). Upon completion of transmission of the meter usage data from the last of the plurality of meters 14, an END signal or character is transmitted from ports 72 and 100 to device 30 through port 32 (via contact 52 and circuit 42 and via contact 106 and output circuit 44, respectively), cable 34 and access point 16. At that time, the long string of meter usage data has been stored in the interrogation device and associated with the plurality of meters for subsequent downloading to a utility billing system whereat the data will be parsed for billing purposes.

In the embodiment described, the interrogation signals are actually clock signals to control timing of system 10 and to power same. Meter usage data are ASCII encoded, seven bits, even parity. The meter usage data nominally will include within its string of characters a leading character, a field delimiter (e.g., to identify that the data to follow is either meter data or a meter identifier), either numeric ASCII signals or characters (e.g., four of them) representing the meter data or alphanumeric ASCII signals or characters (e.g., eight of them) representing the meter identifier, another field delimiter (the other one of data or ID), and the corresponding numeric or alphanumeric characters, and a trailing signal or character.

As will be appreciated, there may be occasion either where no meter is attached to a particular meter port (e.g., port 24c), or a meter register is malfunctioning. In the former event, the data contact 124 should be connected to ground (contact 130) such that only a logical low or zero will be received upon interrogation of that port. In that event, contact 124a will not go high. Data exchanger 46 is programmed to monitor the signal at port 112 to see if the signal does not go high (i.e., it remains at a logic low) for a predetermined time interval such as 15–20 milliseconds. If the signal remains low, data exchanger 46 may output an OMIT signal or character in place of or as a substitute for the meter usage data for that meter followed by the NEXT or END character as appropriate Once the return signal from register 20 goes high, data exchanger 46 monitors for the high to low transition (i.e., the start bit). If no such start bit is detected within 500 milliseconds, then it is assumed that there has been a malfunction. In that event, data exchanger 46 will output a FAIL signal or character in place of or as a substitute for the meter usage data for that meter before proceeding to the NEXT or END character as appropriate.

A skip function is also possible whereby the data exchanger 46 skips to the next available meter port without necessarily finishing interrogation of the current meter. To this end, data exchanger 46 continuously monitors the interrogating clock pulses received at port 86. To order a skip, the interrogation device 30 will transmit a low clock period with a duration of 2,400–3,400 microseconds (with 2.5 milliseconds being nominal). Upon detection by data exchanger 46 of the extended low clock period, data exchanger 46 will finish transmitting whatever character it is then transmitting at ports 72 and 100 and will then send the NEXT character and proceed to the next sequential port (e.g. port 24c) as if the meter reading at the current port (e.g., port 24b) had been completed. If the connection between the interrogation device 30 and access point 16 is interrupted for a period of time, power will be lost and so upon a reconnection, data exchanger 46 will be reinitialized and start the meter reading process all over again. If the interruption is kept brief, e.g., less than 300 milliseconds, exchanger 46 may continue to operate as if power had not been interrupted.

In use, contacts 52 and 108 (and 106 if desired) are coupled via cable 34 to access point 16. Also, contacts 120, 124 and 130 of each port 24 are coupled via a respective cable 22 to the respective meter register 20. Coupler 36 of meter reader interrogating device 30 is mated with access point 16. Interrogation signals in the form of clock pulses are then transmitted from device 30 to power-up expander 12 whereupon expander 12 communicates sequentially via meter ports 24 with each of meters 14 to interrogate and receive from the associated register 20 meter usage data associated with the meter 14. The meter usage data is concurrently coupled back to device 30 via access point 16, advantageously as a long stream of meter usage data for multiple meters all while the device 30 is connected the one time to access point 16. Upon receipt of all the data, device 30 may be disconnected from access point 16 whereupon power will terminate to expander 12 until the next meter reading event is required.

By virtue of the foregoing, there is thus provided a mechanism which facilitates electronic meter reading of a plurality of utility meters without requiring repetitive connection to and disconnection from a plurality of meter access points in order to read the plurality of meters.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. For example, although described in use for reading four water meters at a time, other utility meters, such as gas or electric, may be read with the expander of the present invention. Similarly, more or fewer than four utility meters may be read via one common access point with the expander of the present invention. Additionally, the contacts of ports 24 and 32 may be hardwired to their respective cables such that the distal ends of the cables effectively define the ports. The invention in its broader aspects is therefore not limited to the specific details, representative apparatus and methods and illustrative examples shown and described. Accordingly, departures may be made from such details without departing from the spirit or scope of the general inventive concept.

Having described the invention, what is claimed is:

1. A method of reading a plurality of utility meters comprising the steps of:
   (a) operatively coupling an interrogation device to a port expander device, the port expander device being operatively coupled to the plurality of utility meters;
   (b) transmitting interrogation signals from the interrogation device to the port expander device;
   (c) relaying at least a portion of the interrogation signals from the port expander device to a first one of the plurality of utility meters;
   (d) receiving meter usage data from the first one of the utility meters by the port expander device in response to the interrogation signals;
   (e) relaying at least a portion of the meter usage data from the port expander device to the interrogation device; and
   (f) repeating steps (b) through (e) for a second one of the plurality of utility meters.

2. The method of claim 1, wherein the transmitting step (b) includes the step of transmitting clock pulses from the interrogation device to the port expander device.

3. The method of claim 2, wherein the relaying step (c) includes the step of relaying the clock pulses from the expander device to the utility meter.

4. The method of claim 3, further comprising the step of altering a characteristic of the clock pulses transmitted from the interrogation device to the port expander device, thereby sending a predetermined command to the port expander device.

5. The method of claim 4, further comprising the step of:
   discontinuing transmission by the port expander device to a present one of the utility meters in response to receiving the predetermined command, thereby skipping to a next one of the utility meters.

6. The method of claim 1, wherein the receiving step (d) includes the step of receiving a start signal, data, and a stop signal from the utility meter by the port expander device.

7. The method of claim 6, wherein the relaying step (e) includes the step of relaying the start signal, the data, and the stop signal from the port expander device to the interrogation device.

8. The method of claim 7, further comprising the step of transmitting a next meter signal from the port expander device to the interrogation device, prior to repeating steps (b) through (e).

9. The method of claim 1, wherein the receiving step (c) includes the steps of:
   monitoring a data output line associated with the utility meter by the port expander device; and
   transmitting an omit meter or a fail meter signal from the port expander device to the interrogation device in response to not receiving valid data from the data output line for a predetermined time period.

10. The method of claim 1, wherein the coupling step (a) includes the step of coupling the interrogation device to the port expander device with a radio-frequency data link.

11. The method of claim 1, wherein the coupling step (a) includes the step of coupling the interrogation device to the port expander device with a telephone data link.

12. The method of claim 1, wherein the coupling step (a) includes the step of coupling the interrogation device to the port expander device with a direct electrical coupling.

13. The method of claim 12, further comprising the step of deriving power for the port expander device from the interrogation signals received from the interrogation device.

14. The method of claim 13, further comprising the step of transferring power derived from the interrogation signals from the port expander device to a communication port of the utility meter, thereby enabling the communication port to report meter usage data to the port expander device.

* * * * *